(12) United States Patent
Perdrigeon et al.

(10) Patent No.: US 12,247,498 B2
(45) Date of Patent: Mar. 11, 2025

(54) SYSTEM FOR CHANGING THE PITCH OF THE BLADES OF A TURBOMACHINE PROPELLER

(71) Applicant: SAFRAN AIRCRAFT ENGINES, Paris (FR)

(72) Inventors: Christophe Marcel Lucien Perdrigeon, Moissy-Cramayel (FR); Clement Cottet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/570,342

(22) PCT Filed: Jun. 13, 2022

(86) PCT No.: PCT/FR2022/051114
§ 371 (c)(1),
(2) Date: Dec. 14, 2023

(87) PCT Pub. No.: WO2022/263753
PCT Pub. Date: Dec. 22, 2022

(65) Prior Publication Data
US 2024/0218800 A1  Jul. 4, 2024

(30) Foreign Application Priority Data
Jun. 15, 2021 (FR) ..................... 2106337

(51) Int. Cl.
*F01D 7/00* (2006.01)
*B64C 11/32* (2006.01)
*F01D 9/04* (2006.01)

(52) U.S. Cl.
CPC ............... *F01D 7/00* (2013.01); *B64C 11/32* (2013.01); *F01D 9/041* (2013.01); *F05D 2260/50* (2013.01); *F05D 2260/70* (2013.01)

(58) Field of Classification Search
CPC . F01D 7/00; F01D 17/162; F01D 1/26; F01D 15/10; F01D 15/12; F01D 5/30;
(Continued)

(56) References Cited

U.S. PATENT DOCUMENTS 4,718,823 A * 1/1988 Dennison ................ B64C 11/38
416/162
5,199,850 A * 4/1993 Carvalho .............. B64C 11/325
416/165
(Continued)

FOREIGN PATENT DOCUMENTS

| FR | 2908451 A1 | 5/2008 |
| FR | 3059364 A1 | 6/2018 |
| WO | 2013/050704 A1 | 4/2013 |

OTHER PUBLICATIONS

International Search Report and Written Opinion received for PCT Patent Application No. PCT/FR2022/051114, mailed on Aug. 22, 2022, 17 pages (8 pages of English Translation and 9 pages of Original Document).

*Primary Examiner* — Eric J Zamora Alvarez
(74) *Attorney, Agent, or Firm* — WOMBLE BOND DICKINSON (US) LLP

(57) ABSTRACT

A system for changing the pitch of the blades of a turbomachine propeller, each blade being mounted so as to pivot about a pitch axis, the system including a control means and a connection mechanism connecting the control means to each blade of the propeller, the connection mechanism including, for each blade of the propeller: —a connecting rod having a first end connected to the control means; and —an eccentric having a first end connected to the blade in order to rotate same about its pitch axis and a second end forming a yoke connected to a second end of the connecting (Continued)

rod by a pivot connection; the yoke of the eccentric being oriented towards the pitch axis of the blade.

5 Claims, 8 Drawing Sheets

(58) Field of Classification Search
CPC ...... F01D 5/026; F01D 9/041; F05D 2220/36; F05D 2260/70; F05D 2220/323; F05D 2260/76; F05D 2260/50; F05D 2260/74; F05D 2220/325; F05D 2240/12; F05D 2240/24; F04D 29/323; F04D 29/362; B64C 11/32
See application file for complete search history.

(56) References Cited

U.S. PATENT DOCUMENTS

| | | | | |
|---|---|---|---|---|
| 5,391,055 | A * | 2/1995 | Carvalho | B64C 11/38 |
| | | | | 416/157 R |
| 5,431,539 | A * | 7/1995 | Carvalho | B64C 11/32 |
| | | | | 416/157 R |
| 9,849,970 | B2 * | 12/2017 | Escure | B64C 11/30 |
| 2017/0066525 | A1 * | 3/2017 | Tomaszewicz | B64C 11/30 |
| 2020/0131917 | A1 | 4/2020 | Lemarchand et al. | |
| 2021/0108523 | A1 * | 4/2021 | Miller | F02K 3/06 |

* cited by examiner

--PRIOR ART--

--PRIOR ART--

--PRIOR ART--

SYSTEM FOR CHANGING THE PITCH OF THE BLADES OF A TURBOMACHINE PROPELLER

TECHNICAL FIELD

The present invention relates to the field of the aircraft turbomachines and in particular to the propulsion propellers of these turbomachines which comprise variable pitch vanes.

BACKGROUND

The technical background comprises in particular documents U.S. Pat. No. 5,431,539 A, US 2020/131917 A1 and FR 3 059 364 A1.

Changing the pitch or variable pitch of the blades of a turbomachine propeller is one way of improving the performance and efficiency of the turbomachines in different flight conditions.

Turbomachines with at least one unducted propeller, also referred to as "open rotor" or "unducted fan", are equipped with these pitch change systems. In this category of turbomachine, there are those with two unducted and counter-rotating propellers (UDF, for Unducted Fan) or those with a single unducted propeller and a flow straightener comprising several stator vanes (USF, Unducted Single Fan).

An open-rotor turboshaft engine mainly comprises a coaxial "gas generator" part and a coaxial "propulsion" part inside a stationary cylindrical nacelle carried by the aircraft structure. The gas generator part can be arranged upstream or downstream of the propulsion part. The terms "upstream" and "downstream" are defined in relation to the circulation of the gases in the turbomachine. The propulsion part comprises two coaxial and counter-rotating propellers, upstream and downstream respectively, which are driven in reverse rotation by a turbine, in particular a low-pressure turbine, of the gas generator part via a reduction gear, for example with epicyclic gear trains. The propellers extend substantially radially from the longitudinal axis of the drive shaft outside the nacelle.

Generally speaking, each propeller comprises a substantially cylindrical rotary casing carrying an outer polygonal annulus hub rotatably received about the longitudinal axis in the stationary nacelle. The hub comprises radial cylindrical housings distributed around its periphery around the longitudinal axis. Shafts with radial axes, perpendicular to the longitudinal axis of the turbomachine, secured to the roots of the blades, are received in the housings of the polygonal annulus and also pass through radial passages in the cylindrical casing.

To allow the turboshaft engine to operate optimally in the various flight phases encountered, the blades of the counter-rotating propellers can rotate in the radial housings of the annulus. To do this, they are driven in rotation about their respective pivot axes, referred to as the pitch axis, by an appropriate system that allows the pitch of the blades to be varied during flight, i.e., the pitch of the propellers.

This system for changing the pitch of the blades of the propellers covers an angular range of rotation between two extreme positions, namely a "reverse" extreme position in which the blades extend, for example, 30° beyond the plane transverse to the axis of the turboshaft engine (the direction in which the aircraft is moving forward) in order to help brake the aircraft, in the manner of conventional thrust reversers, and a "feathering" extreme position in which the blades are as far back as possible in relation to the direction of forward travel of the aircraft, for example in the event of an engine failure, and thus offer as little resistance (drag) as possible. The angular travel of the blades between the feather and reverse positions is, for example, around 120°.

Generally speaking, a system for changing the pitch of the blades of a propeller comprises a control means and a connection mechanism connecting the control means to each blade of the propeller to ensure the desired angular pivoting of the blades.

Various solutions have been proposed for changing the pitch of the blades of the propellers on turboshaft engines of the "open rotor" type or others.

For example, the document FR 2 908 451 is known for a turboshaft engine in which the system for changing the orientation of the blades of each propeller advantageously comprises a single annular cylinder mounted by its cylinder part on the annulus hub of the propeller, while its piston is connected, by a connection mechanism of the system associated with the cylinder, to the roots of the various blades. The movement of the piston as a result of the fluidic control of the annular cylinder ensures the desired angular pivoting of the blades by the connection mechanism by varying their pitch.

Also known from the document WO 2013/050704 is another pitch change system for an aircraft propeller turbomachine comprising a single annular cylinder arranged on a stationary casing or internal stator with respect to the hub of the propeller and a connection mechanism comprising a transfer bearing attached on one side to the movable part of the cylinder and cooperating, on the other side, with a connection means for connecting the mechanism to the blades of the rotating hub, in such a way that the transfer bearing of the rotationally driven mechanism transmits the translational displacement of the movable part of the stationary cylinder to the connection means for connecting the rotating mechanism in order to change the orientation of the blades of the propellers.

An example of a pitch change system for changing the pitch of the blades of a propeller is shown in FIG. 1. In this example, the stem of the cylinder is in its extended position corresponding to the feather position of the blades. FIGS. 2 and 3 show a more detailed view (FIG. 2) and cross-section (FIG. 3) of the connection mechanism along the longitudinal axis of the turboshaft engine.

The connection mechanism 1 comprises articulated connecting rods 2 distributed around the annular cylinder 3 and connected on one side to the piston 4 and on the other side to the radial shafts 5 secured respectively to the roots of the blades of the propeller, so as to cause the rotation of the radial shafts and the associated blades as a result of the translational movement of the connecting rods of the connection mechanism. A connection mechanism of this type with connecting rods guarantees safe and reliable operation in use, without parts sliding and/or rubbing against each other.

More specifically, in order to make this kinematic connection, each connecting rod 2 comprises a link 6 and an eccentric 7. One end of the link 6 is connected to the piston 4 and the other end is connected to one end of the eccentric 7 via a yoke 8, while the other end of the eccentric is connected to the radial shafts 5 secured to the roots of the blades of the propeller. The yoke 8 allows to connect the link 6 to the eccentric 7 by means of a pivot connection with axis X parallel to the radial axis of pitch A of the associated blade. The yoke 8 is U-shaped and is intended to receive the axis X to make the pivot connection. It faces outwards from the pitch axis. In other words, the yoke comprises two arms connected by a central portion closer to the pitch axis than the open portion defined between the free ends of the two arms.

By connecting the links to the eccentrics, the translational movement of the cylinder is transformed into a rotational movement of the blade by means of a lever arm effect to transmit the necessary torque to the blades of the propeller and thus drive them in rotation.

However, the maximum angle, noted a, of rotation of the eccentric (corresponding to the feather position of the blades) is therefore limited by the residual clearance, noted J, close to the machining of the yoke as shown in FIG. 3.

SUMMARY OF THE INVENTION

The purpose of the present invention is to remedy these disadvantages and to propose a system for changing the pitch of the blades of the propeller, the design of the yoke of which allows to optimise the extent of the angular trajectory of the eccentric in order to optimise axially the overall dimension for the kinematic control of a propeller.

To this end, the invention relates to a system for changing the pitch of the blades of a propeller of a turbomachine, each blade being mounted so as to pivot along a pitch axis, the system comprising a control means and a connection mechanism connecting the control means to each blade of the propeller, the connection mechanism comprising, for each blade of the propeller:

a link having a first end connected to the control means; and an eccentric having a first end connected to the blade to drive it in rotation about its pitch axis and a second end forming a yoke connected to a second end of the link by a pivot connection.

According to the invention, the yoke of the eccentric is U-shaped to receive the axis of the pivot connection and comprises two arms connected by a central portion further away from the pitch axis than an open portion of the yoke opposite the central portion and defined between the free ends of the two arms so that the eccentric yoke is oriented towards the pitch axis of the blade.

By orienting the yoke of the eccentric towards the pitch axis of the blade, also referred to as the internal yoke in the following, the travel path of the kinematic control by link is increased. This allows the tangential clearance in the connection between the link and the eccentric to be shifted so that the eccentric's travel is no longer constrained.

This type of connection allows the full angular trajectory to be maintained without being blocked by a potential interference at the level of the connection between the link and the eccentric.

Advantageously, the eccentric can have a curvature oriented towards the link in order to further reduce the minimum possible angle of rotation of the eccentric.

Similarly, a curvature of the link towards the pitch axis would also reduce this minimum possible angle by increasing the tangential clearance.

The invention also relates to an aircraft turbomachine comprising at least one propeller equipped with blades and a pitch change system for changing the pitch of the blades as described above.

The turbomachine can be of the "open rotor" type, i.e., where the propeller is unducted.

The invention also applies to the turbomachines of the USF type, i.e., having a single unducted propeller and a flow straightener comprising several stator vanes.

BRIEF DESCRIPTION OF FIGURES

The invention will be better understood and other details, characteristics and advantages of the present invention will become clearer from the following description made by way of non-limiting example and with reference to the attached drawings, in which.

The elements having the same functions in the different embodiments have the same references in the figures.

DESCRIPTION OF THE EMBODIMENTS

Figure 4:
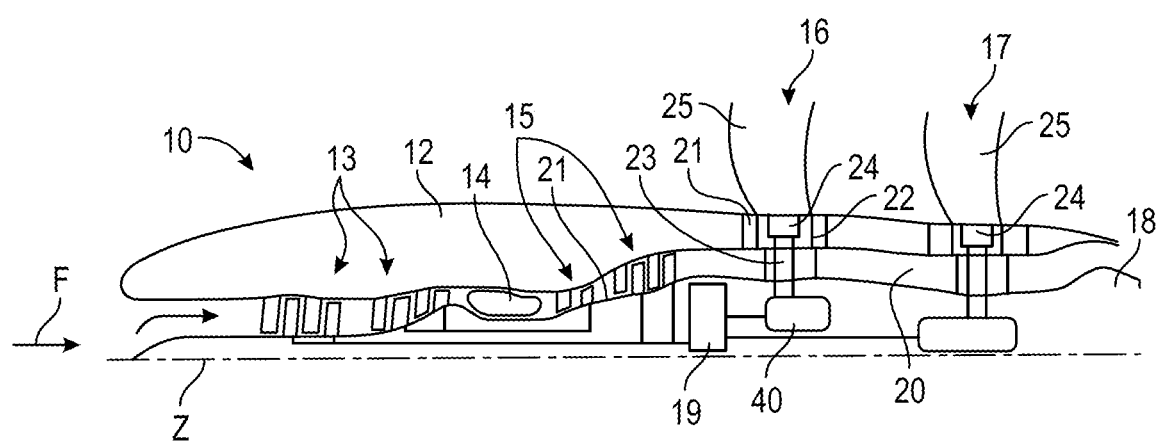
FIG. 4 shows a schematic axial cross-section of an example of a turbomachine with a system for changing the pitch of the blades of a propeller in accordance with the invention.
Figure 5:
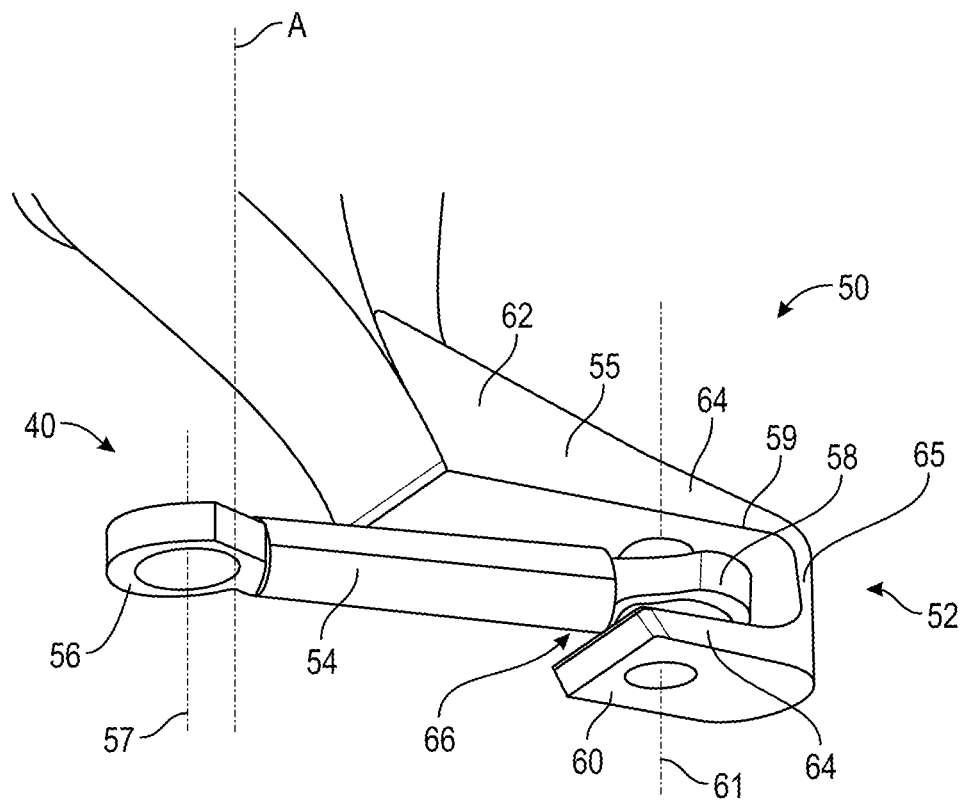
FIG. 5 shows a perspective view of a connection mechanism equipping a pitch change system according to the invention.

FIG. 4 shows a turbomachine, such as a turboshaft engine with an unducted fan, intended to equip an aircraft referred to as an "open rotor". However, the invention can be applied to other types of turbomachine.

The turbomachine 10 comprises a nacelle 12 in which is arranged a gas generator which comprises, from upstream to downstream, an assembly of compressors 13, a combustion chamber 14 and an assembly of turbines 15. A nozzle 18 is arranged downstream of the gas generator.

The compressor assembly 13 may comprise one or two compressors, depending on the architecture of the single- or two-stage gas generator. The turbine assembly 15 may comprise a high-pressure turbine and a low-pressure turbine, or two turbines (high-pressure and intermediate-pressure) and a low-pressure turbine. The gas generator drives the low-pressure turbine around a rotor shaft with a longitudinal axis Z.

The turbomachine comprises a doublet of counter-rotating propellers with an upstream propeller 16 and a downstream propeller 17. These two upstream propellers 16 and downstream propellers 17 are driven in rotation in a counter-rotating manner by the low-pressure turbine by means of a mechanical transmission device 19. The upstream propeller 16 and the downstream propeller 17 are mounted coaxially with the longitudinal axis Z of the turbomachine 10 and are arranged in parallel radial planes, which are perpendicular to the longitudinal axis Z. In the present example, the propellers 16, 17 are mounted downstream of the gas generator. The mechanical transmission device 19, shown here schematically, may comprise a differential reduction gear or an epicyclic gear train housing. The upstream propeller 16 and the downstream propeller 17 can of course be driven directly by the low-pressure turbine.

According to the configuration described above, the flow of air, noted F, entering the turbomachine is compressed in the compressor assembly 13, then mixed with fuel and burnt in the combustion chamber 14. The combustion gases generated then pass through the turbines 15 to drive, via the mechanical transmission device 19, the counter-rotating propellers 16 and 17, which provide most of the thrust. The combustion gases are expelled through the nozzle 18, contributing to the thrust of the turbomachine 10. The gases pass through a primary gas flow duct 20 extending substantially axially in the turbomachine between the nacelle 2 and a central casing 21 associated with the gas generator.

In the present example, the upstream propeller 16 comprises a cylindrical casing rotatable relative to the nacelle 12 of the turbomachine about a rotor shaft of longitudinal axis Z. The casing is also connected to a corresponding part of the mechanical transmission device 19. The casing comprises a polygonal annulus 21 in which radial housings 22 and radial passages are formed, which are coaxial and each traversed by a shaft 23 of radial axis Y, hereinafter referred to as radial shaft 23, connected to a root 24 of blade 25 of the corresponding propeller 16, 17. The blades 25 extend radially outwards from the nacelle 12. The radial housings 22, in this case cylindrical, are evenly distributed around the periphery of the polygonal annulus 21 and receive the roots 24 of the blades 25.

The blades 25 of the upstream and downstream propellers are of the variable pitch type, i.e., they can be oriented about their radial axes, referred to as the pitch axis noted A, by means of a system 40 for changing the pitch of the blades, so that they occupy an optimum angular position according to the operating conditions of the turbomachine and the phases of flight concerned.

In this description, only the system 40 for changing the pitch of the blades associated with the upstream propeller 16 will be described. The downstream propeller 17 can be equipped with a similar or different pitch change system for changing the pitch of the blades.

Such a pitch change system comprises a control means and a connection mechanism 50 connecting the control means to each blade 25 of the propeller 16.

Figure 1:
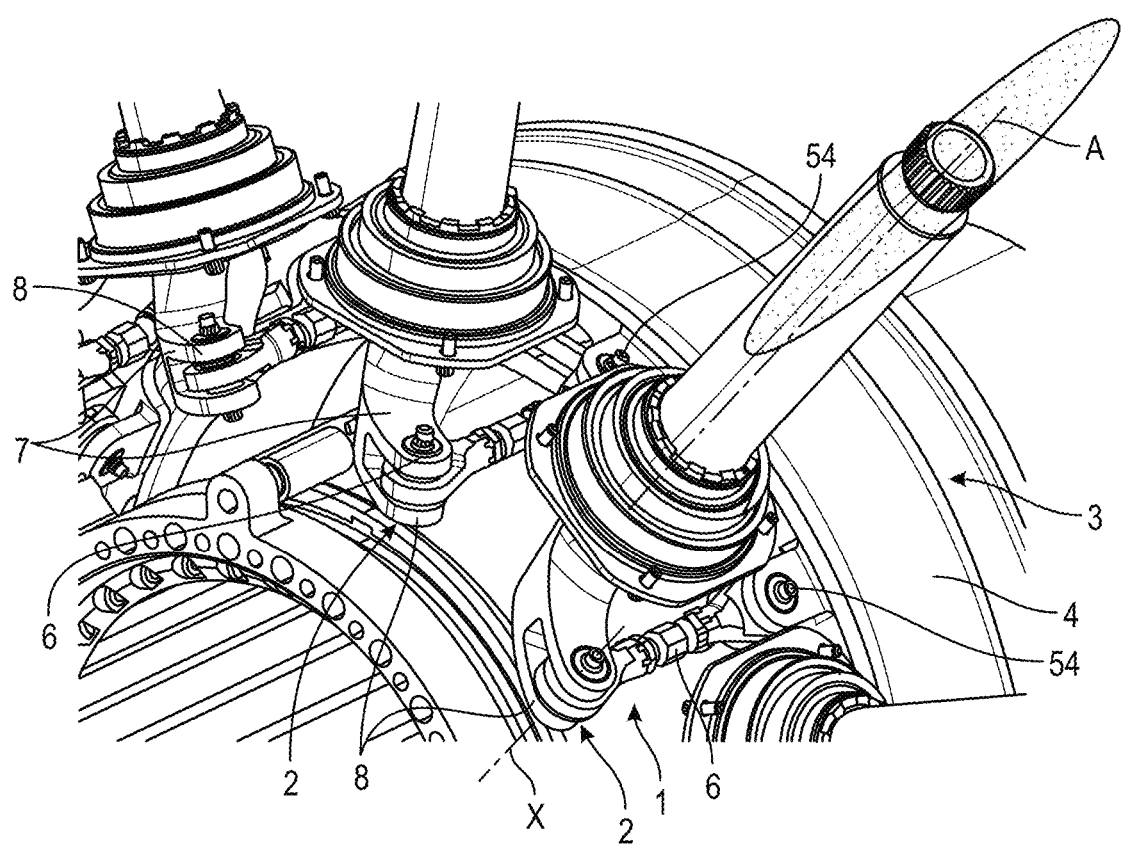
FIG. 1, already described, shows a system for changing the pitch of the blades of a propeller according to an example of the prior art.
Figure 2:
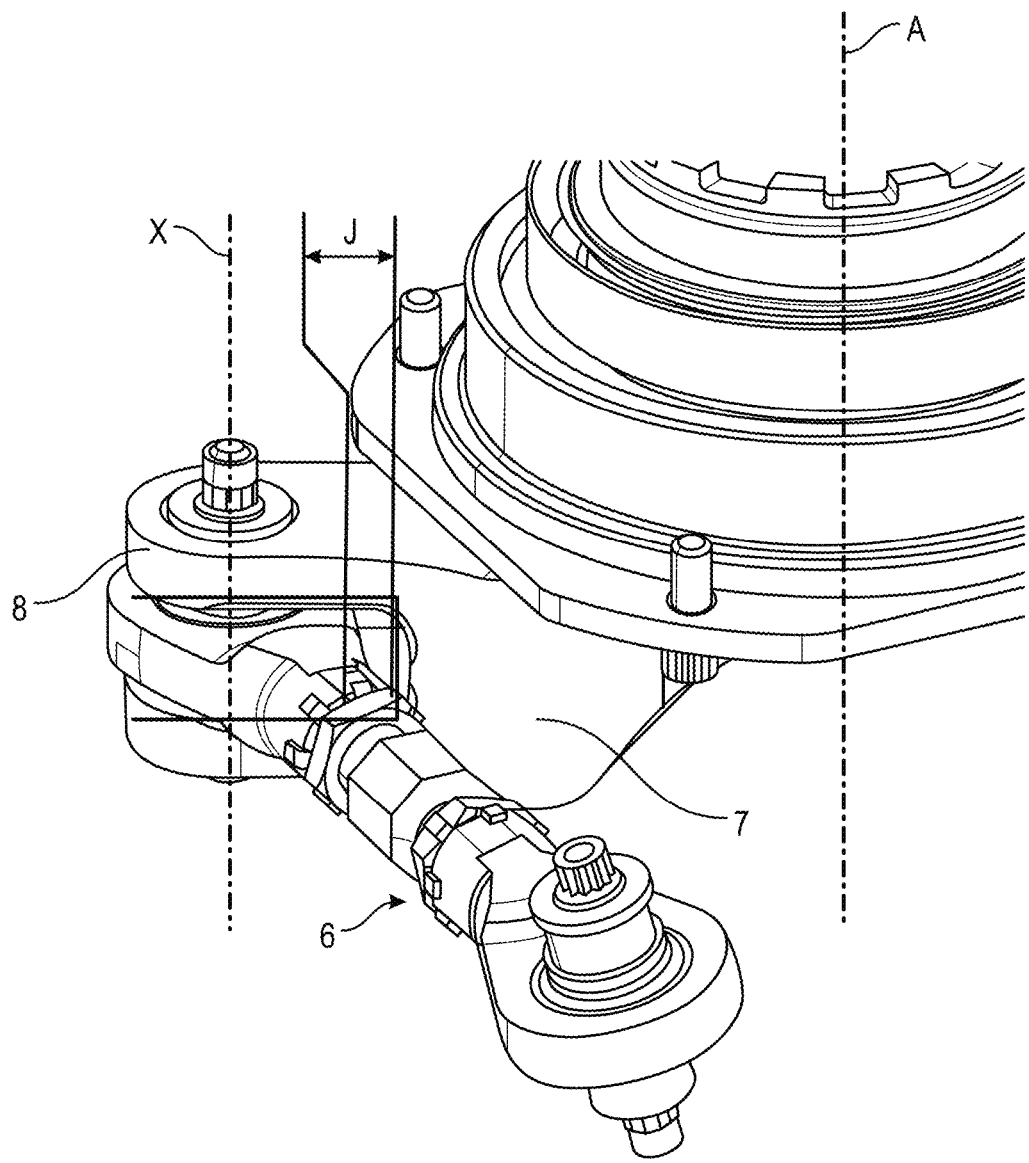
FIG. 2, already described, shows an enlarged view of a connection mechanism equipping the pitch change system of FIG. 1.
Figure 3:
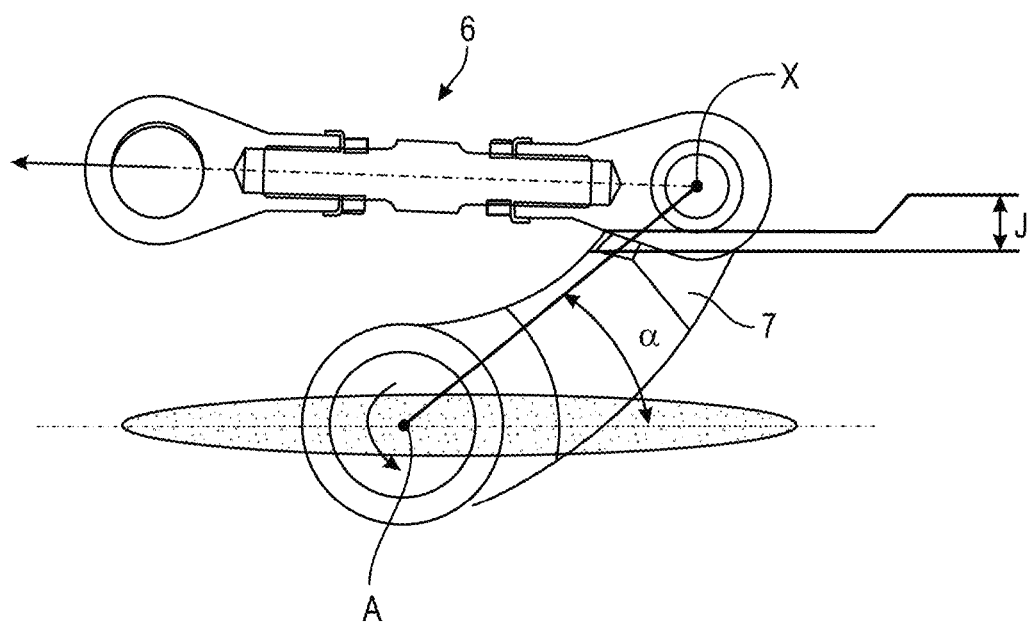
FIG. 3, which has already been described, shows a radial cross-sectional view of the connection mechanism equipping the pitch change system shown in FIG. 2.

The control mean is not detailed here. It comprises an actuator with a stationary body and a body movable in translation relative to the stationary body along the longitudinal axis Z, for example an annular cylinder 3 (as shown in FIG. 1) with linear action along the longitudinal axis Z of the turboshaft engine. The connection mechanism 50 connects the cylinder to the roots 24 of the blades 25 of the propeller.

The connection mechanism 50 is arranged around the actuator. The latter is arranged to axially displace the connection mechanism 50, which is connected to the radial shafts 23 of the blade roots in such a way that the axial displacement of the connection mechanism 50 causes the blades to change pitch. The radial shafts 23 rotate about the radial axis A in the radial housings 22.

Preferably, the pitch change system 40 comprises a load transfer bearing arranged to connect the connection mechanism 50 to the movable body so as to ensure the transmission of the axial forces exerted by the movable body of the actuator.

The connection mechanism 50 also comprises an assembly of articulated connecting rods 52 which are regularly distributed around the actuator and which are intended to act on the roots 24 of the blades 25 via the radial shafts 23 to drive them in rotation about their radial axis A. There are as many connecting rods 52 as there are blades 25.

Referring to FIGS. 5 to 9, which illustrate in more detail the connection mechanism 50 associated with a blade according to the invention, each connecting rod 52, associated with a blade, comprises a link 54 and an eccentric 55.

A first end 56 of the link 54 is connected to the actuator about a hinge axis 57 parallel to the radial axes A of the blades. The other end 58 of the link 54 is connected to a first end 59 of the eccentric 55 via a yoke 60 by a pivot connection via a hinge axis 61 parallel to the above.

The other end 62 of the eccentric 55 is connected to the radial shaft 23 secured to the root 24 of the blade 25 of the propeller.

The yoke 60 allows to connect the link 54 to the eccentric 55 by means of a pivot connection with axis X parallel to the radial axis A of the associated blade. The yoke 60 is U-shaped and is intended to receive the axis X to make the pivot connection. It is directed towards the pitch axis A. In other words, the yoke comprises two arms 64 connected by a central portion 65 further from the pitch axis A than the open portion 66 defined between the free ends of the two arms 64 and opposite the central portion 65.

The orientation of the yoke 60 of the eccentric 55 towards the radial pitch axis A allows to free up the angle of rotation of the eccentric about the radial axis A.

Figure 6:
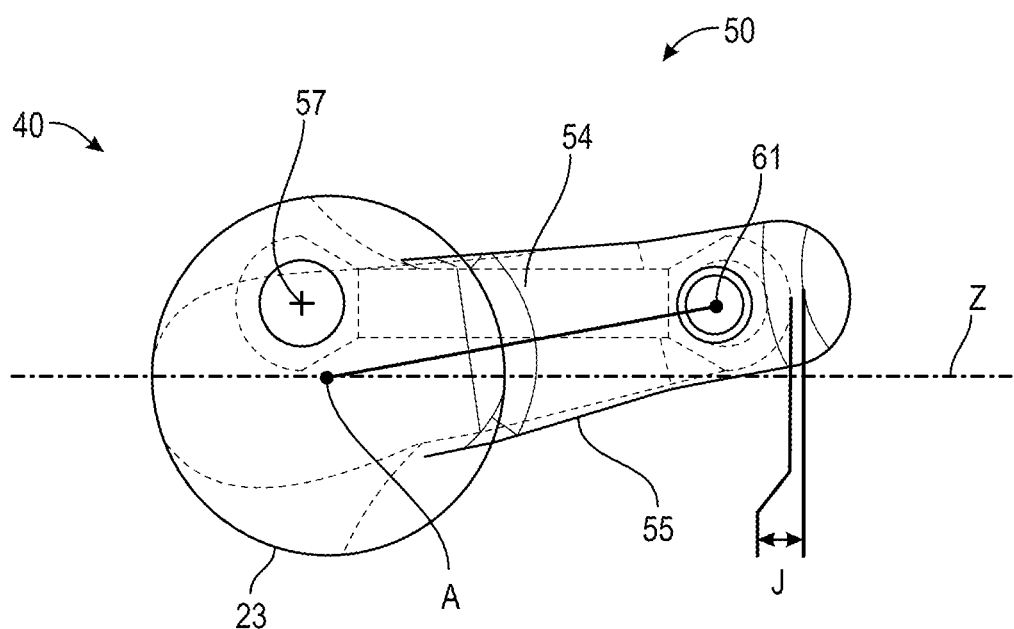
FIG. 6 shows a top view of the connection mechanism shown in FIG. 5.

This configuration allows to move the residual clearance, noted J in FIG. 6, between the link 54 and the eccentric 55 into an area that is not constrained by the trajectory of the eccentric. In the example shown in FIGS. 5 and 6, the link 54 passes completely under the eccentric 55.

Figure 7:
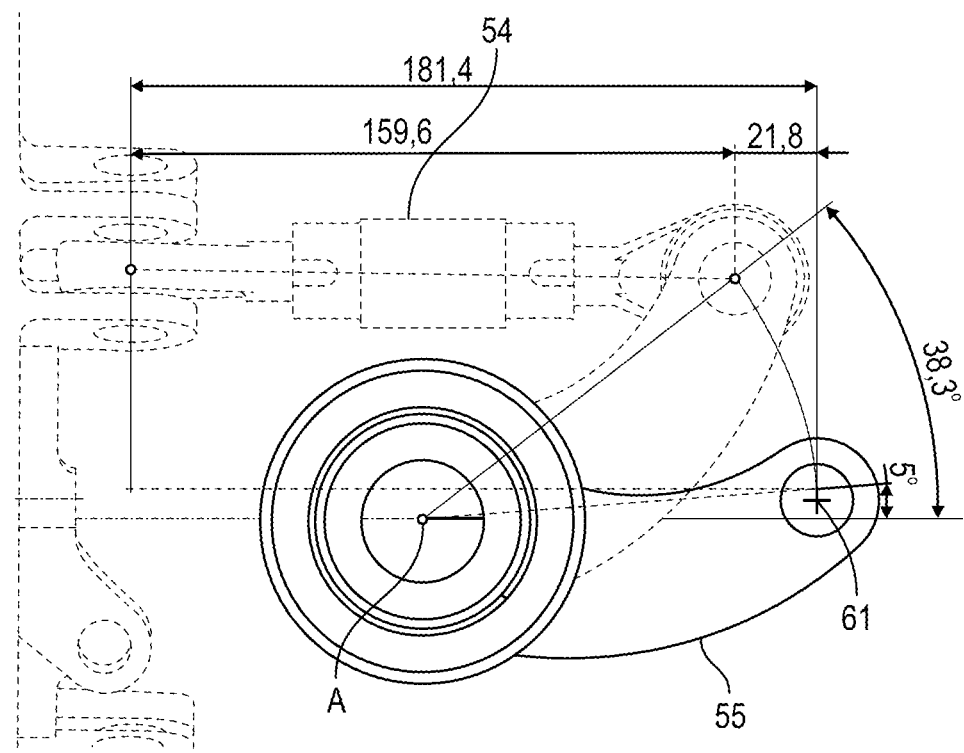
FIG. 7 shows a top view of the kinematics of operation of a connection mechanism according to the invention between the two extreme positions for an "open rotor" type turboshaft engine.

The minimum angle of rotation of the eccentric (corresponding to the feather position of the blades) is therefore no longer limited by the tangential clash between the link 54 and the eccentric 55 but by the "non-kickback" angle defined by the eccentric aligned with the engine axle, which is limited to 5° in practice. For example, on a turboshaft engine of the "open rotor" type, the tangential clash angle corresponding to a cylinder extended for a feathered position as shown in FIG. 7 is 38.3°, i.e., the minimum angle below which it is not necessary to descend with a residual clearance J of 5 mm.

Thanks to the invention, the minimum angle is freed from this constraint, so the eccentric can mechanically move as close as possible to the engine axle when the cylinder is in the retracted position. The overall dimension noted L of the connection between the link and the cylinder is therefore reduced mechanically to a minimum when the cylinder is in the extended position, as shown in FIG. 7.

By way of comparison, using this type of yoke on an "open rotor" type turboshaft engine results in an axial gain of 22 mm in the length of the link, assuming a minimum angle of 5°, allowing to reduce the stroke of the cylinder and the length of the link, and therefore saves on axial overall dimension.

Figure 8A:
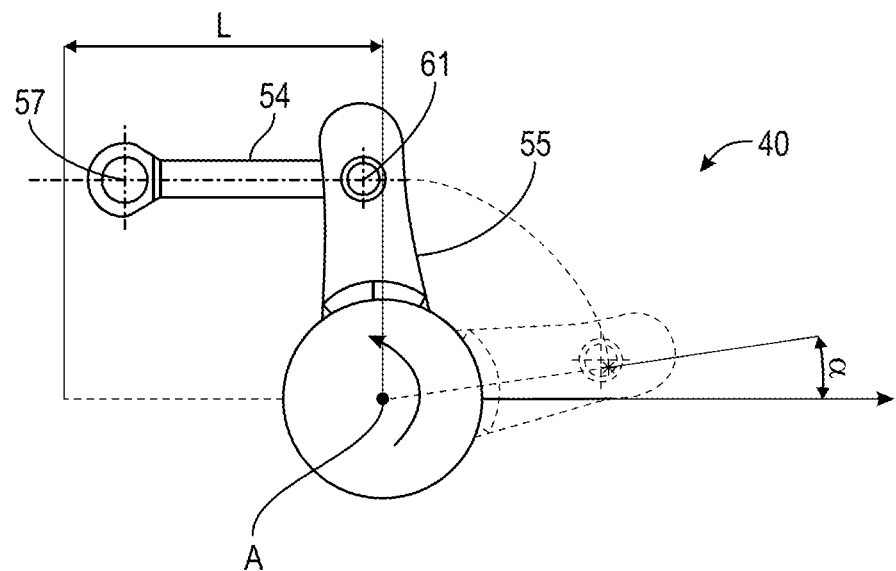
FIGS. 8A and 8B illustrate the kinematics of operation of a connection mechanism according to the invention between the two extreme positions for a turboshaft engine of the USF type.
Figure 8B:
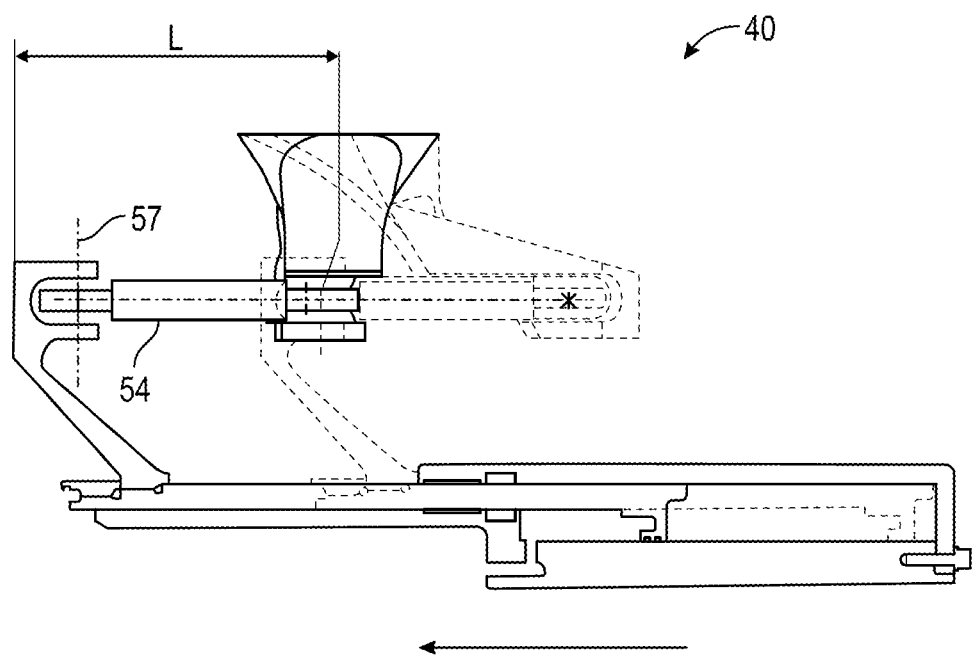

FIGS. 8A and 8B illustrate the kinematics of operation of the connection mechanism 50 between the two extreme positions that can be occupied by the blades of the propellers, shown in top view and cross-section respectively, for a USF type turboshaft engine. The kinematics for this type of turboshaft engine are reversed compared with those for an "open rotor" turboshaft engine: the cylinder retracted corresponds to the "feather" position, while the cylinder extended corresponds to the "reverse" position.

When the system 50 is in the position shown as a dotted line in FIGS. 8A and 8B, in which the annular control cylinder is in the retracted position, the blades of the propeller are in the feathered position, i.e., approximately in the extension of the turboshaft engine so as to offer as little resistance as possible (drag). This feathered position of the blades of the propeller is used, for example, in the event of an engine failure.

When it is desired to modify the orientation of the blades of the propeller, the pitch change system 40 acts and, to this end, the annular cylinder is controlled, causing the movable part of the cylinder to move in translation according to the selected travel, imposed by the pitch change system. In the example shown in FIGS. 8A and 8B in solid lines, the movable part has moved until it is in the maximum extended position, corresponding to the reverse position of the blades.

As shown in FIGS. 8A and 8B, when the connection mechanism 50 is moved in translation along the arrow, the links 54 are pulled by means of hinges 57 and, via the pivot connections 61 of the yoke 60, drive the eccentrics 55 which define lever arms in the manner of a conventional connecting rod-crank connection so as to facilitate their rotation. The eccentrics 55 therefore pivot around the geometric axis of the radial shafts A to which they are secured to, so that the roots of the blades rotate in their respective housings in the polygonal annulus.

In addition, to further reduce the minimum tangential clash angle, the eccentric and/or the link can be bent. In particular, the eccentric can have a curvature C1 directed towards the link. Alternatively, the link can have a curvature C2 oriented towards the pitch axis.

Figure 9:
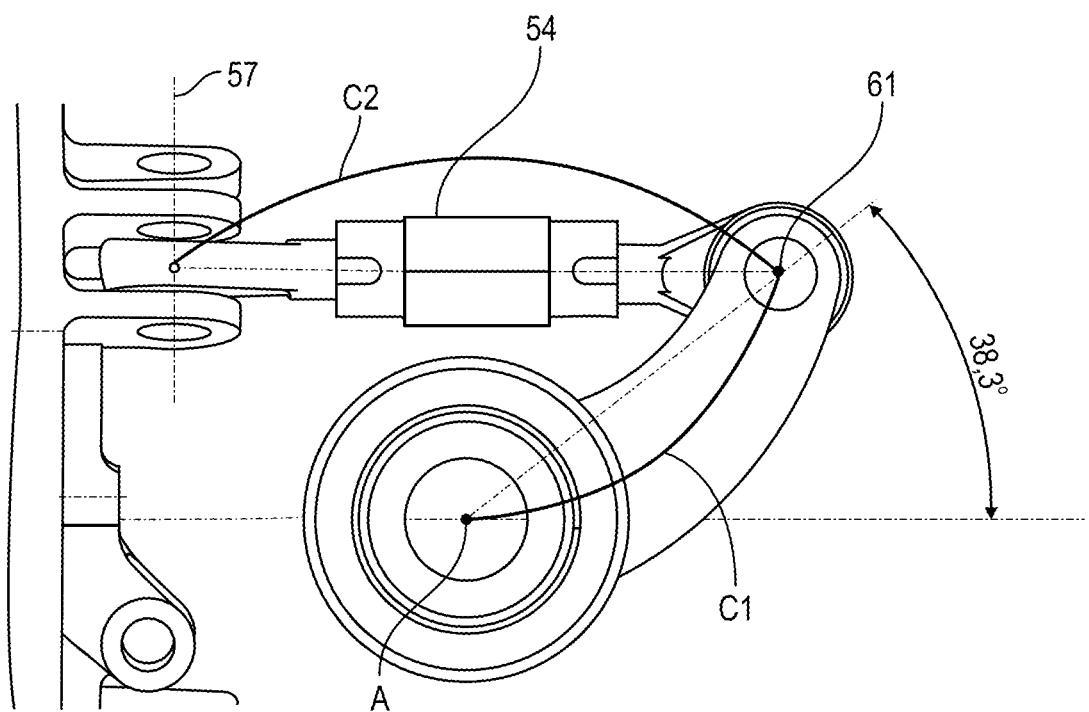
FIG. 9 illustrates another embodiment of a connection mechanism according to the invention for an "open rotor" turboshaft engine.

The two types of curvatures C1 and C2 are shown in FIG. 9.

The invention claimed is:

1. A system for changing a pitch of blades of a propeller of a turbomachine, each blade being mounted to pivot about a pitch axis, the system comprising a control means and a connection mechanism connecting the control means to each blade of the propeller, the connection mechanism comprising, for each blade of the propeller:
   a link having a first end connected to the control means; and
   an eccentric having a first end connected to each blade to drive each blade in rotation about the pitch axis of each blade and a second end forming a yoke connected to a second end of the link by a pivot connection via a hinge axis;
   wherein the yoke of the eccentric is U-shaped to receive the hinge axis of the pivot connection and comprises two arms connected by a central portion and an open portion opposite the central portion and the open portion being defined between free ends of the two arms, the central portion being further away from the pitch axis than the open portion of the yoke so that the hinge axis of the pivot connection is arranged between the central portion of the yoke and the pitch axis and such that the yoke of the eccentric is oriented towards the pitch axis of each blade.

2. The pitch change system according to claim 1, wherein the eccentric has a curvature oriented towards the link.

3. The pitch change system according to claim 1, wherein the link has a curvature oriented towards the pitch axis.

4. A turbomachine for an aircraft comprising at least one propeller equipped with blades and the system for changing the pitch of the blades according to claim 1.

5. The turbomachine according to claim 4, wherein the at least one propeller is unducted.

* * * * *